United States Patent
Benitez Aguilar et al.

(10) Patent No.: US 10,221,368 B2
(45) Date of Patent: Mar. 5, 2019

(54) METHOD OF INHIBITING CORROSION USING A CORROSION INHIBITOR DERIVED FROM VEGETABLE OILS

(71) Applicant: INSTITUTO MEXICANO DEL PETROLEO, Mexico City (MX)

(72) Inventors: Jose Luis Rodolfo Benitez Aguilar, Mexico City (MX); Amalia Tobon Cervantes, Mexico City (MX); Arquimedes Estrada Martinez, Mexico City (MX); Nancy Navarro Ordonez, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 123 days.

(21) Appl. No.: 15/217,086

(22) Filed: Jul. 22, 2016

(65) Prior Publication Data

US 2017/0029960 A1    Feb. 2, 2017

(30) Foreign Application Priority Data

Jul. 27, 2015    (MX) .................... MX/a/2015/009643

(51) Int. Cl.
| | |
|---|---|
| *C10G 75/02* | (2006.01) |
| *C23F 11/04* | (2006.01) |
| *C23F 11/14* | (2006.01) |
| *C09K 8/54* | (2006.01) |
| *C23F 11/10* | (2006.01) |

(52) U.S. Cl.
CPC ................ *C10G 75/02* (2013.01); *C09K 8/54* (2013.01); *C23F 11/10* (2013.01); *C23F 11/149* (2013.01); *C10G 2300/207* (2013.01)

(58) Field of Classification Search
CPC ... C10G 75/02; C10G 2300/207; C23F 11/04; C23F 11/149
See application file for complete search history.

(56) References Cited

U.S. PATENT DOCUMENTS

| | | |
|---|---|---|
| 2,205,754 A | 6/1940 | Sweeney et al. |
| 2,330,524 A | 9/1943 | Shields et al. |
| 2,668,100 A | 2/1954 | Luvisi et al. |
| 3,623,979 A | 11/1971 | Maddox, Jr. et al. |
| 3,758,493 A | 9/1973 | Maddox, Jr. et al. |
| 3,846,071 A | 11/1974 | Redmore |
| 4,388,214 A | 6/1983 | Oppenlaender |
| 5,214,155 A | 5/1993 | Hollingsworth et al. |
| 5,300,235 A * | 4/1994 | Clewlow ............... C23F 11/145 208/47 |
| 5,322,630 A | 6/1994 | Williams et al. |
| 5,322,640 A | 6/1994 | Byrne et al. |
| 6,448,411 B1 | 9/2002 | Meyer |
| 8,399,386 B2 * | 3/2013 | Nguyen ................ C09K 8/594 166/308.6 |

FOREIGN PATENT DOCUMENTS

| | | |
|---|---|---|
| CA | 1 178 578 | 11/1984 |
| EP | 0 526 251 A1 | 2/1993 |

* cited by examiner

*Primary Examiner* — Randy Boyer
(74) *Attorney, Agent, or Firm* — Dickinson Wright PLLC

(57) ABSTRACT

The present invention is directed to a formulation of corrosion inhibitors for corrosion control of low carbon steel piping, carrying different fuels products, obtained in refineries or petrochemical processes. The composition comprises active imidazoline inhibitors derived from vegetable oil selected from the group consisting of sunflower, canola, soybean, safflower, corn and mixtures thereof that are reacted with a polyalkylated polyamines such as diethylenetriamines (DETA), triethylenetetramine (TETA) and tetraethylenepentamine (TEPA). The imidazoline is reacted with 1 to 3 moles of a carboxylic acid having 2 to 6 carbon atoms. The product obtained is formulated with 50 to 60% weight of an aromatic solvent and 10 to 20 wt % of an alcohol. The compositions were evaluated in sour environments under the NACE TM0172 and ASTM G 185 method, and both, sour and sweet environments in the NACE ID182 method, so they are fit to pass the tests as indicated by the NRF-005-PEMEX-2009 standard for application in pipelines.

11 Claims, 3 Drawing Sheets

Figure 1:
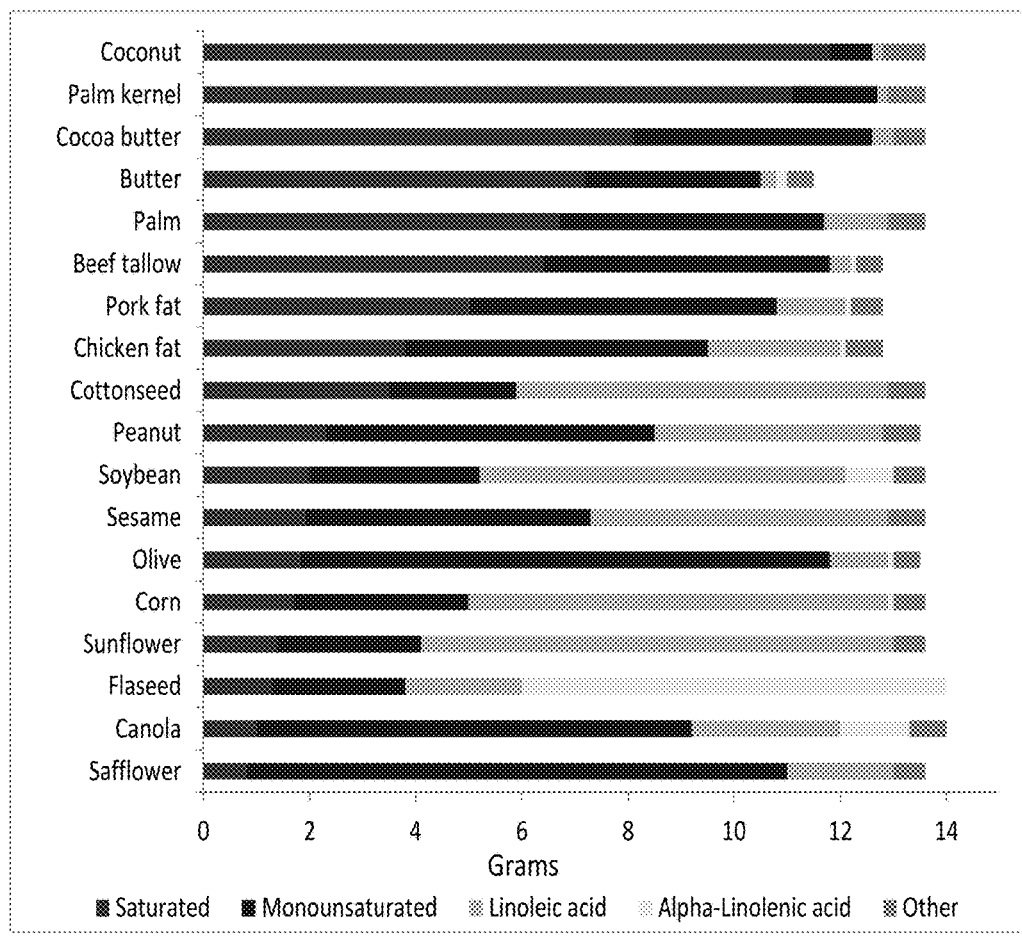

METHOD OF INHIBITING CORROSION USING A CORROSION INHIBITOR DERIVED FROM VEGETABLE OILS

This application claims the benefit to Mexican patent application MX/a/2015/009643 filed Jul. 27, 2015, which is hereby incorporated by reference in its entirety.

TECHNICAL FIELD

The present invention relates to a process of obtaining of a corrosion inhibitor carboxy-imidazoline, which is obtained in two steps: the first step comprises obtaining imidazolines from derivatives of commercial vegetable oils selecting sunflower oil, canola, soybean, safflower, corn, and/or mixtures thereof which react with polyalkylated polyamines such as diethylenetriamines (DETA), triethylenetetramine (TETA) and tetraethylenepentamine (TEPA). In a second step, the imidazoline obtained is reacted with 1 to 3 moles of a carboxylic acid which can be from 2 to 6 carbon atoms; especially acrylic acid. The final corrosion inhibitor composition and formulation of corrosion inhibitors of the present invention includes 60-70% of an aromatic solvent and 10-20% alcohol w/w.

The chemical structure of the active compound of the present invention is as follows in Scheme (1):

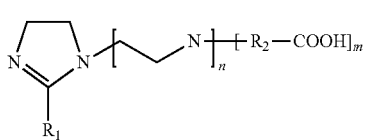

(1)

wherein $R_1$ from is lipid mixture, which contain the characteristic vegetable oils of its origin, having $C_8$ to $C_{22}$ carbon atoms which may be saturated, monounsaturated or polyunsaturated, n can be 1 to 3, being the best results 1. $R_2$ is a hydrocarbon chain, such as an alkyl or alkenyl chain of the carboxylic acid, which can be 2 to 6 carbon atoms, especially the use of acrylic acid. Finally m has a range of 1 to 3, preferably two carboxylic acid molecules are used.

The active compounds of this invention, show efficiencies around 90% according to results obtained by different analytical tests: 1) Electrochemical Test (Rp) in medium sour (ASTM G 185 or equivalent), 2) Bottle test method NACE ID182 means both sour and sweet, 3) Rustproof NACE TM0172 method in medium sour with rating of A. Therefore, the active corrosion inhibitor can be used in Atmospheric towels, vacuum, hydrodesulfurization plants, among others, by preliminary evidence confirming the application.

BACKGROUND OF THE INVENTION

The oil industry began in 1859 with the drilling of the first oil well production and operation of the first refinery two years later. Since then the refining processes and transportation have evolved as obtaining commercial hydrocarbons, seeking to reduce environmental effects (OSHA Technical Manual).

Pipelines constructed of low carbon steel as the main means of transport of hydrocarbons, among others, crude oil, gasoline, middle distillates and oxygenates, are expose to corrosive agents such as $H_2S$, $CO_2$, $O_2$, $H_2O$, organic acids and soluble salts. Similarly, due to the characteristics of the land where these pipelines are installed, they undergo drastic operating conditions, which have corrosion problems both external surfaces as internal. With regard to internal corrosion, ways to mitigate damage include mechanical cleaning and the use of corrosion inhibitors. Therefore, inhibitors require high efficiency to control corrosion.

The main type of corrosion, which occurs in the ducts (those carrying hydrocarbons) is uniform and localized corrosion observed as corrosion products sulfides and iron oxides. The main allotropic form of iron oxides is hematite; while for the case of sulfides are pyrite.

Moreover globally, and in order to control the problems of internal corrosion that occur in pipelines, they have been mainly used corrosion inhibitors that have the peculiarity to function properly in environments where the main corrosion products are iron oxides. In addition, the establishment of strict environmental criteria governing the application of inhibitors has resulted in several types of chemicals that were used as a basis to produce corrosion inhibitors, are removed from use for failing to meet environmental criteria established worldwide. In addition to this, in ducts where hydrocarbons have been transporting by ships, it has detected the presence of high amounts of water and inorganic salts that generate deposit corrosion under. Given the above facts, it is necessary that new inhibitors efficiently controlling corrosion problems that occur in the ducts, which are environmentally friendly and economically competitive.

The corrosion inhibitors are required in low concentration between 3 to 7 ppm, are able to control problems uniform corrosion that occurs in pipelines carrying hydrocarbons. It is important that these inhibitors also control problems uniform and localized corrosion that occurs, under high turbulence in the pipelines with high water content such as the so-called "playeros".

The company Petroleos Mexicanos (PEMEX) produces about 2.548 million barrels per day (bpd) of crude oil, of which 1,199 Mbd are processed in its refineries producing different fuels and oxygenated hydrocarbons, which are transported on its 40,106 Km length piping. Also, other products from the United States are processed (Yearbook PEMEX 2013). The transported hydrocarbons include to a greater or lesser degree gases such as $CO_2$, $H_2S$ and $O_2$, contaminated with salts or even with complex agents, which generate corrosion on such ducts.

Flow Changes in pipelines alter the operating conditions, which lead to differences in pH, affecting the corrosion rates of materials. Other factors affecting the process of corrosion of pipelines is the change of temperature, flow rate, pressure, etc. (Materials Performance, August 2002 16-21 and Corrosion Science, 49, 2007, 4308-4338). The problem is that there is not a universal corrosion inhibitor able to protect materials from all corrosive compounds existing in the different currents. Since we do not have such an inhibitor, at least we must have one to protect from the main transported currents.

By the end of 1930, the main storage containers of fuel were manufactured of metals such as steel, aluminum, brass, zinc and other. They suffered corrosion damage because fuel was contaminated with considerable amounts of water, so the use of water-based corrosion inhibitors such as sodium uranates (U.S. Pat. No. 2,205,754), were continuously added to the tanks. Subsequently they were used organic compounds as those obtained from the reaction product of an alkyl amine and saturated aliphatic carboxylic acid, as those presented in the U.S. Pat. No. 2,330,524.

Furthermore, by the 1950 in several researches it were showing that, inhibitors in their structure have a polar part and a hydrocarbon chain is straight or branched. For imidazolines, these have three components; a ring or head, a tail long chain hydrocarbon and a side chain attached to the head, which may be a short chain hydrocarbon with active or polar functional group (Corrosion Science, 36.1994, 315-325).

The realization of our literature search was focusing mainly on the imidazolines as our new development emphasizes obtaining these imidazolines new structure based on their starting materials and their preparation process. Examples of structures imidazole is U.S. Pat. No. 2,668,100, for use as corrosion inhibitors in gasoline, diesel and fuel oil. lmidazoline have the following general formula shown in the diagram (2):

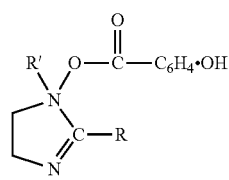

(2)

The imidazoline is a derivative of salicylic acid where R in position 2, is an aliphatic group containing from 13 to 17 carbon atoms.

U.S. Pat. Nos. 3,623,979 and 3,758,493, indicate that the inhibitor is a condensation product of a polymeric acid and 1-aminoalkyl-2-alkyl-2-imidazoline whose formula is represented in the scheme (3):

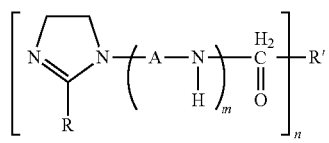

(3)

this compound is soluble and dispersible in the brine, which can be applied continuously or intermittently, wherein: R is a fatty acid of tall oil that is an alkyl radical of 17 to 32 carbon atoms. The fatty acid of tall oil, is a compound obtained as a byproduct in the manufacture of paper pulp from conifers, by the Kraft process. The composition is a mixture of about 50% resin acids, 35% palmitic, oleic and linoleic acids and unsaponifiables 15% as heavy hydrocarbons, higher alcohols and sterols; A is a bivalent radical of ethylene; m is 1 to 5; n may be 2 to 4 which indicates the basicity of the polymeric acid; and R' is an alkyl radical of a polymeric acid of 15 to 70 carbon atoms.

Tall oil acids may be linoleic, stearic or a combination of linoleic and oleic cuts. Amines for forming imidazoline may be diethylenetriamine, triethylenetetramine and tetraethylenepentamine. It is noted that the U.S. Pat. No. 3,758,493 patent reports the use of dimer or trimer fatty acids or a polymeric high molecular weight fatty acid instead of tall oil.

Summarizing found in patents U.S. Pat. No. 3,846,071, CA 1,178,578, U.S. Pat. No. 4,388,214, EP 526.251 A1, U.S. Pat. Nos. 5,322,630, 5,214,155, 5,322,640 and 6,448,411 B1. The radicals attached to the imidazoline are hydrocarbon chains alkenyl or Alkyl, which may range from 7 to 25 carbon atoms. These chains are mainly of oleic acid and tall oil fatty acid. Throughout the literature review was conducted, obtaining imidazolines from an amine such as diethylenetriamine (DETA), triethylenetetramine (TETA) and tetraethylenepentamine (TEPA), with the fatty acid of tall oil, is the most common method obtaining imidazoline.

The chemical structure of oleic acid has 18 carbon atoms with a ligature, as shown in the following scheme (4):

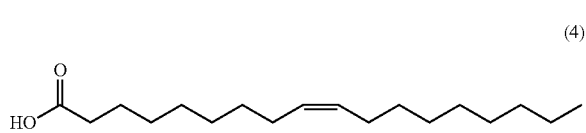 [SMILES: CCCCCCCC/C=C\CCCCCCCC(=O)O]

(4)

At one end of this molecule we found the carboxylic group and half of the hydrocarbon chain have a double bond.

Vegetable oil is an organic compound obtained from seeds or other plant parts. These products offered in the market are pure edible oil and edible vegetable oil. The pure edible oil is obtain from one type of plant; when it is a mixture of oils, the product is call edible vegetable oil. Although there are a variety of plants from which vegetable oil is extract, the main are safflower, corn, sesame, sunflower, cotton, soybean, olive, canola and others. The most frequent (solid) fats or oils (liquids) are a mixture of triglycerides with minor amounts of other lipids. Triglycerides are the most abundant family of lipid and the main fuel reserve, the general formula of these triglycerides shown in the following scheme (5):

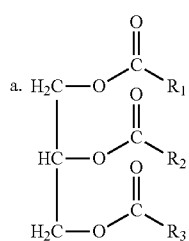

(5)

Glycerol is capable of binding to three fatty acid radicals called carboxylates. These fatty radicals usually are different from each other; they may be saturated or unsaturated. Extension chain fatty radicals $R_1$, $R_2$ and $R_3$ may be from 12 to 24 carbon atoms. Exist in nature at least 50 fatty acids (J. Am Oil Chem. Soc. (2009) 86, 991), on the other hand these chains can be saturated or unsaturated, so that we can have from 1 to 3 unsaturations that give the liquid characteristic at room temperature.

As is known, saturated fats like butter and beef are those that increase cholesterol in humans, while polyunsaturated fats help lower cholesterol (Nutrition Action Health letter July/2002 August 3). In FIG. 1 is plotted the type of oil and its composition based on the degree of saturation of each oil, so that as it descends from the list decreases saturated compounds and increasing the percent of unsaturation oils. An oil with less saturated groups is better, and it is preferable that the oil has omega-3 fat (polyunsaturated) which can protect the heart, the latter three compounds is flaxseed oil, which has higher content of omega 3. On an industrial scale combinations are made in order to obtain products with better taste and health benefits.

SUMMARY OF THE INVENTION

The fats or oils are sources of carboxylic acids for obtaining the imidazoline of the present invention. One object of the present invention is directed to a method of use of vegetable oils in a process to obtain corrosion inhibitors and corrosion inhibitor compositions and to a method of inhibiting corrosion using the corrosion inhibiting composition.

Commercial oil samples that were selected are based on the low price and different varieties by origin, because even when it is known that flaxseed oil has more polyunsaturated, its price is the highest, in the same condition the oil is olive. The properties of oils are show in Table 1.

As shown in Table 1, Canola oil has the lowest content of saturated fatty acids, and soybean oil has the highest. In the case of the lowest oil is monounsaturated Soya and the highest is Sunflower. Finally polyunsaturated, the lowest is to Safflower and the higher the Soybean, as also shown in FIG. 1. Ideally the oil has no saturated fat and more polyunsaturated, but before fat mixtures thereof, is likely that the experiments may be able to give an indication of the improvement as a corrosion inhibitor.

TABLE 1

Commercial oils composition

| | Fatty acids (14 g portion) | | |
|---|---|---|---|
| Origin | Saturated (gr) | Monounsaturated (gr) | Polyunsaturated (gr) |
| Sunflower | 1.49 | 5.93 | 5.95 |
| Canola | 0.96 | 8.27 | 4.20 |
| Soybean | 2.1 | 3.12 | 8.40 |
| Safflower | 1.12 | 10.56 | 2.08 |
| Canola/Sunflower | 1.01 | 8.03 | 4.40 |
| Corn | 1.82 | 4.21 | 7.10 |

For the reasons explained above, the present invention overcomes markedly the above references and known by the applicant by providing a corrosion inhibitor composition containing a carboxy-imidazoline that has the ability to operate at such low concentrations between 3 to 7 ppm based on the amount of the hydrocarbon that achieves control of uniform corrosion problems that occur in the pipelines carrying hydrocarbons.

Therefore, one object of the present invention to provide a corrosion inhibitor and corrosion inhibitor composition or formulation, which has the ability to control uniform corrosion that occurs in pipelines carrying hydrocarbons, among others, crude oil, fuel, middle distillates and compounds oxygenates.

Another object of the present invention is to provide a process for obtaining active carboxy-imidazoline compounds derived from vegetable oil for producing corrosion inhibiting compositions.

The features of the invention are basically obtained by proving a corrosion inhibitor composition for inhibiting corrosion of low carbon steel, such as steel pipelines for the transportation of sour and sweet hydrocarbon streams. The hydrocarbon stream can be crude oil, fuel, middle distillates and oxygenates. The corrosion inhibitor composition contains a carboxy-imidazoline compound obtained or derived from a vegetable oil such as sunflower, canola, safflower and canola/sunflower blends. The carboxy-imidazoline compound is included in an amount of about 30 to 40 wt %. The corrosion inhibitor composition can include a solvent or carrier such as 50 to 60 wt % of an aromatic compound or solvent and 10 to 20 wt % of an alcohol.

The invention is further directed to a method for producing the carboxy-imidazoline corrosion inhibitor compound by reacting an imidazoline with a carboxylic acid having 2-6 carbon atoms, where the imidazoline and carboxylic acid have the formula

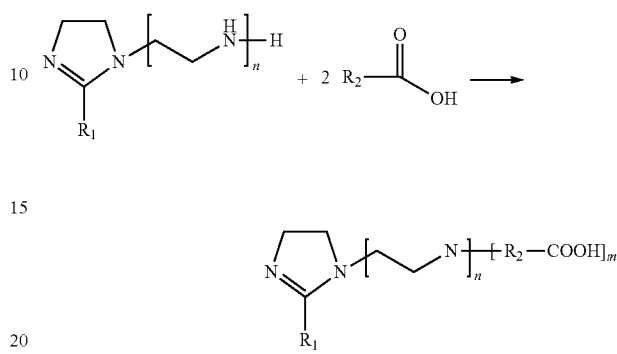

where $R_1$ is a radical from functional groups from vegetable oils having $C_8$ to $C_{22}$ carbon atoms which may be saturated, monounsaturated or polyunsaturated; $R_2$ is an alkyl radical of a carboxylic acid with 2 to 6 carbon atoms, n has a range of 1 to 3; and m has a range of 1 to 3. The reaction can be carried out at a temperature of 100° C. to 125° C. and preferably 110° C. to 120° C. The reaction can be carried out for about 5 to 6 hours.

The imidazoline precursor of the invention can be obtained by the reaction with a vegetable oil with a polyalkylated polyamine by heating at a temperature of about 270° C. to obtain the imidazoline and water and glycerin as byproducts. The water can be removed by distillation. In one embodiment, the polyalkylated polyamine is selected from the group consisting of diethylenetriamine, triethylene tetramine and tetraethylenepentamine.

BRIEF DESCRIPTION OF THE DRAWINGS OF THE INVENTION

In order to provide clear and accurate description of the present invention, reference will be made to the accompanying drawings.

FIG. 1 shows the composition of vegetable oils based on saturated fat, monounsaturated and polyunsaturated (omega 6 and 3).

Figure 2:
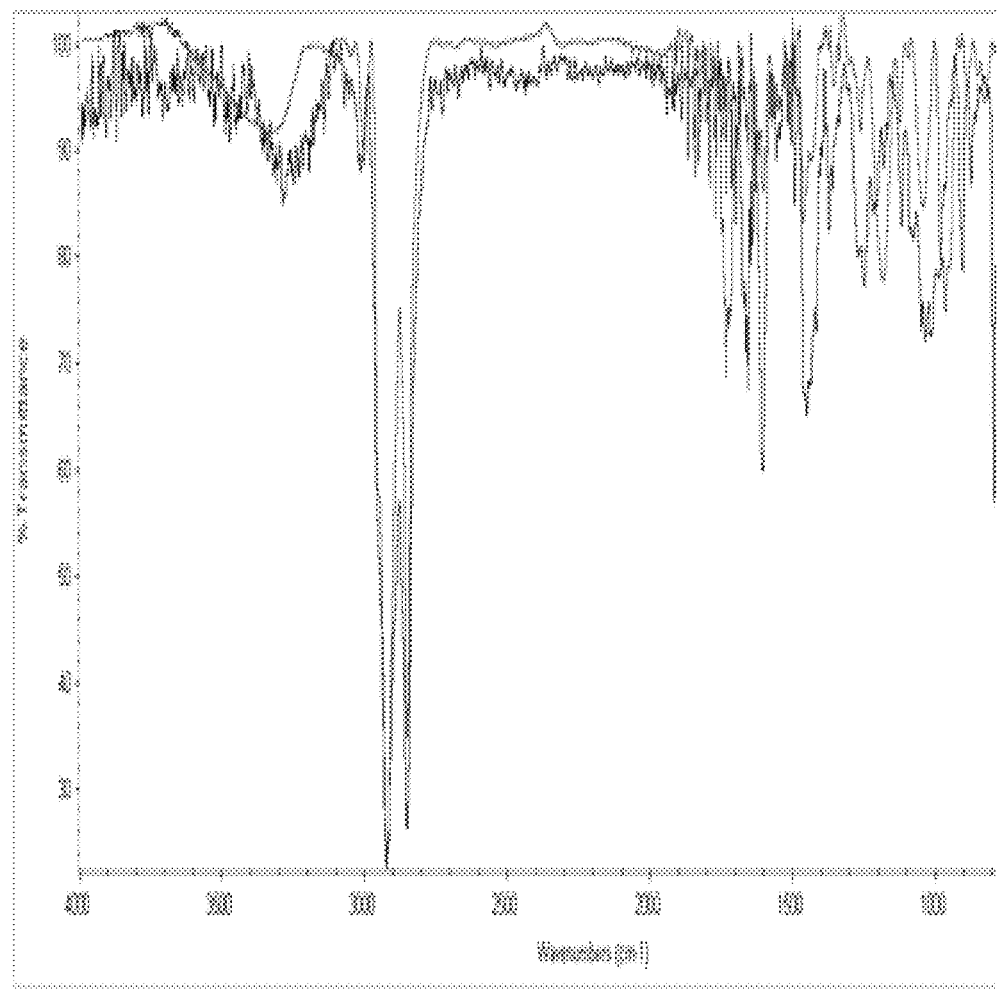

FIG. 2 presents the infrared spectrum of imidazolines; Derived from vegetable oil (blue line) and tall oil fatty acid (red line).

Figure 3:
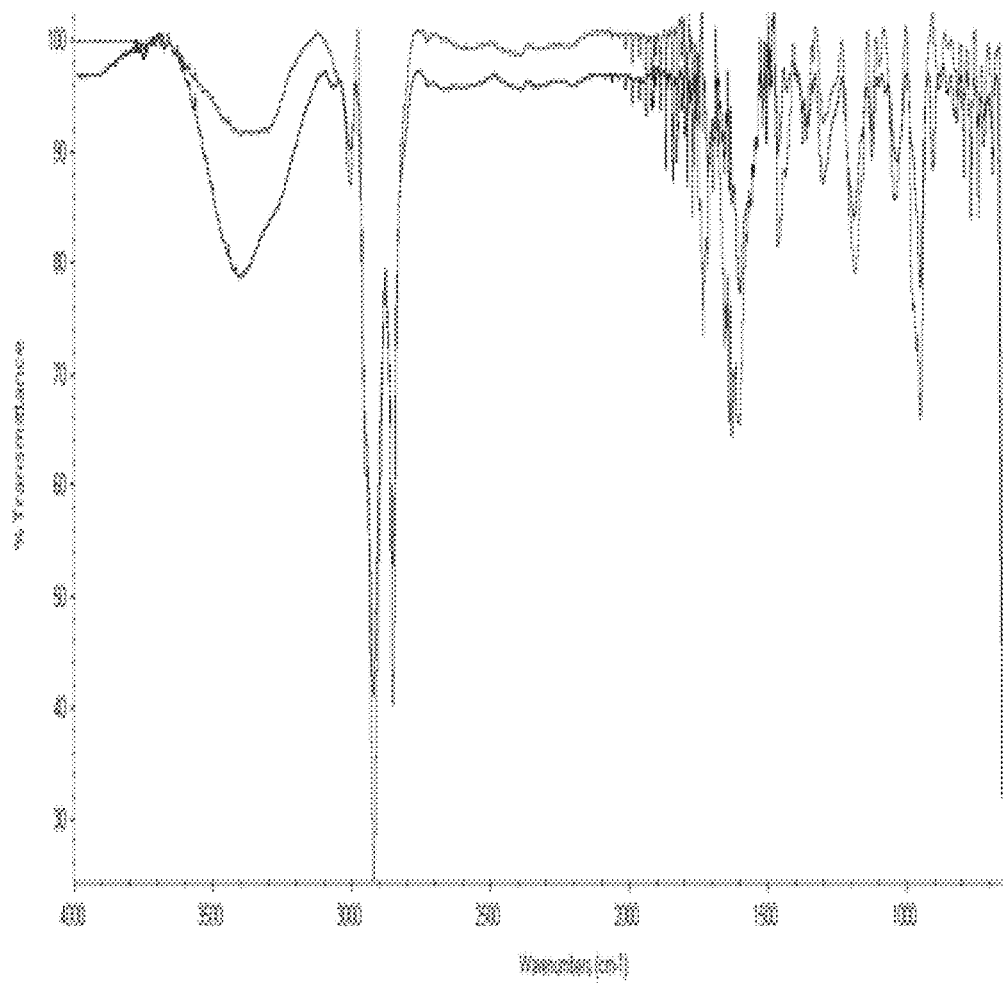

FIG. 3 illustrates the infrared spectrum of imidazoline modified with two moles of carboxylic acid—derived from vegetable oil (blue line) and tall oil fatty acid (red line).

DETAILED DESCRIPTION OF THE INVENTION

The present invention relates to a corrosion inhibitor composition and to corrosion inhibitors including carboxy imidazoline type compounds for pipelines carrying hydrocarbons, among others, crude oil, fuel, middle distillates and oxygenates.

The main active corrosion inhibitor compounds of the present invention have the following chemical structure (1):

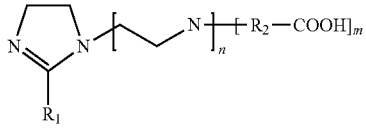
(1)

Imidazoline containing two side chains, where R are mixtures of saturated linear hydrocarbon chains or unsaturated, from the characteristic vegetable oils of each oil, $C_8$ to $C_{22}$ carbon atoms, n can be from 1 to 3 depending on the polyalkylated polyamine. $R_2$ is a linear hydrocarbon having 2 to 6 carbon atoms and m has a range of 1 to 3, which is the number of moles of carboxylic acid used. In one embodiment, the carboxylic acid is acrylic acid.

The preparation process in the present invention is based on the synthesis of compounds that work as active components for the development of corrosion inhibitors, which consists of two steps; the first step is to obtain the imidazoline precursor, and the second stage is the modification of the imidazoline to synthesize the active component, formulated to obtain the corrosion inhibitor.

According to the foregoing paragraph, imidazolines usually are obtained from an acid and an amine. To use the fatty acid radicals containing vegetable oils is by two methods. One is obtaining vegetable oil fatty acid through the acid hydrolysis. This requires a purification process which increases the amount of imidazoline obtained. The other is based on the production process of biodiesel, where the transesterfication takes place, consisting of three reversible and consecutive reactions. The triglyceride is converted consecutively to a diglyceride, monoglyceride and glycerin. In each reaction one mole of methyl ester is released (Ind. Eng. Chem. Res, 2009, 48, 6162-61723. Note that in this process the KOH is used as a catalyst. In this process the following scheme where the esters are formed in an approximate proportion of 90% plus 10% glycerol, scheme (6).

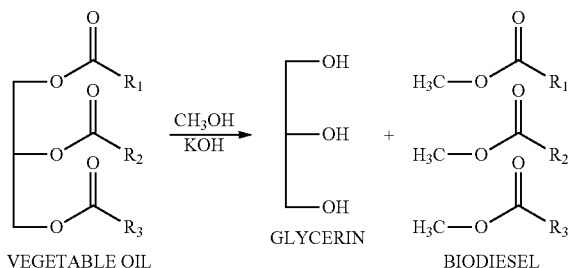
(6)

The variant process of the invention is effected directly by adding the vegetable oil with the amine to give the imidazoline. It is important to note that for each mole of the vegetable oil three moles of the amine are needed, scheme (7).

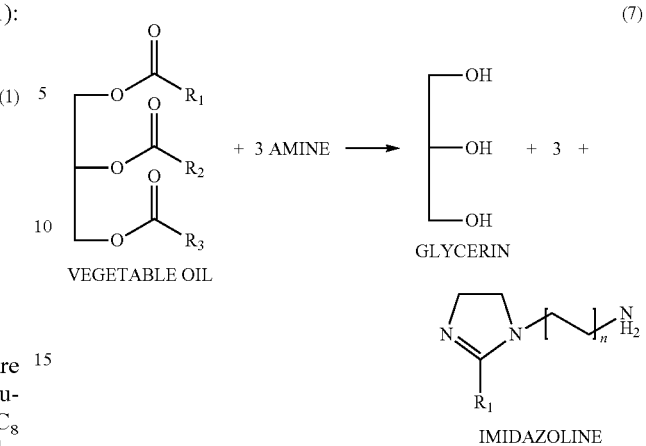
(7)

The amines used for the preparation of imidazoline are polyamines such as diethylenetriamines (DETA), triethylenetetramine (TETA) and tetraethylenepentamine (TEPA).

The reaction mechanism is similar to the process for obtaining biodiesel, but instead of using a basic catalyst (KOH) and methanol, reaction of the present invention uses only the amine. The reaction temperature in the process of obtaining biodiesel is from 65 to 70° C. (transesterification) The reaction to obtain the imidazoline of the present invention this is done at temperatures between 140 to 180° C. to carry out transesterification, and 280° C. to obtain the imidazoline. Finally, in the case of transesterification as reactions product we have biodiesel and glycerine, whereas in the reaction of the present invention have three reaction products, water, glycerol and imidazoline. The water is distilled off, while glycerin remains with the imidazoline, scheme (7).

In the scheme (7), the imidazoline obtained wherein $R_1$ is from lipid mixtures containing the characteristic vegetable oils of its origin, having $C_8$ to $C_{22}$ carbon atoms which may be saturated, monounsaturated or polyunsaturated, n may be 1 to 3 depending on the type of polyamines such as diethylenetriamines (DETA), triethylenetetramine (TETA) and tetraethylenepentamine (TEPA).

The second stage of the process of the present invention is the reaction of imidazoline with a carboxylic acid of 2 to 6 carbon atoms and in a molar ratio of 1:1 to 1:3, with respect to the imidazoline.

Finally the active corrosion inhibitor compound obtained from the above reaction was formulated with solvent type aromatic, alcohol or mixture thereof to obtain a formulation of inhibitor that pass the tests of the NRF-005-PEMEX-2009 standard which must present an efficiency of 90%. Examples of suitable aromatic solvents include benzene and toluene although other aromatic solvents can be used. The alcohols can be lower alcohols such as methanol and ethanol although other alcohols can be used. The aromatic and alcohol solvents can be a suitable aromatic and alcohol that is able to dissolve or suspend the carboxy-imidazoline and is able to disperse the carboxy-imidazoline in the selected hydrocarbon to be treated.

Inhibition efficiency determination. The NRF-005-PEMEX-2009 standard "Internal protection of pipelines with inhibitors", is designed for laboratory determination of the efficiency of corrosion inhibitors, which is based on the following three methods.

The first is the standard method NACE TM0172, "Determining Corrosive Properties of Cargoes in Petroleum Product Pipelines", the method is relatively simple, for this a test specimen comprising cylindrical SAE 1010 steel is used, the which is immersed in a mixture consisting of the hydrocarbon to evaluate, distilled water and inhibitor, remaining for a period of 3.5 hours at 38° C. with controlled agitation. The evaluation of rust is based on the percentage of damage test specimen exposed to test fluid and calling based on the following Table 2.

TABLE 2

Rating of the Test Specimen

| Rating | Percent of Test Surface Corroded |
|---|---|
| A | None |
| B++ | Less than 0.1 (2 or 3 spots of no more than 1-mm [0.04-in.] diameter) |
| B+ | Less than 5% |
| B | 5 a 25% |
| C | 25 a 50% |
| D | 50 a 75% |
| E | 75 a 100% |

The score of A or B++ is most suitable for pipeline corrosion control according to the NRF-005-PEMEX-2009 standard; maximum concentration of the inhibitor can be up to 10 ppm.

The second method is the traditional weight loss NACE ID182, "Wheel test method used for evaluation of film-persistent corrosion inhibitors for oilfield applications", and for this purpose a mixture of brine ASTM D-1141-98 type and kerosene is used, the media to evaluate are the sour ($H_2S$) and sweet ($CO_2$).

Finally, the third method is the electrochemical evaluation, where we use the modified method of ASTM G 185-06, "Evaluating and qualifying oil field and refinery corrosion inhibitors using the rotating cylinder electrode", electrochemical techniques for the coupon immersed in a brine of synthetic seawater ASTM D-1141-98 method.

EXAMPLES

The following practical examples will have a better understanding of the present invention, without limiting its scope thereof.

Example 1

Based on the composition of the oils added to a flask, a stoichiometric amount of oil is then slowly added diethylenetriamine (DETA) with stirring, was slowly heated to 130° C. for one hour and increased to 280° C. and maintaining the temperature for 8 hours under the same conditions. During the reaction time the water of the reaction product was collected to monitor it. When the reaction time was over, the product was cooled to room temperature, for further characterization.

The reaction-product characterization was done by infrared spectroscopy (IR) compared with an imidazoline of a fatty acid from tall oil and vegetable oil (FIG. 2 shows a Infrared Spectroscopy imidazoline analysis, obtained by tall oil—red line—and vegetable oil—blue line). The spectra show the removal of carbonyl bands in both, the tall oil fatty acids and vegetable oil; also the signal of the carboxylic group in 1700 $cm^{-1}$, and in the diethylenetriamine, the loss signal Broadband in both, the signals 3365 and 3299 $cm^{-1}$. Similar spectra are taken imidazolines with variations in the hydrocarbon part. Obtaining both imidazolines it is obtained as a reaction byproduct water, which guarantees the formation of the imidazoline ring.

Evaluation imidazoline based on NACE TM-0172 was done using primary gasoline as hydrocarbon, distilled water as a corrosive medium and imidazoline concentration 5 ppm. Table 3, evaluation of different imidazoline derived from commercial oils is presented.

As shown, there are three imidazolines fail the test under these conditions, probably the causes of low performance of these may be due to the relationship of mixtures that comprise, as well as impurities such as gums bring oils among others.

TABLE 3

Evaluation test NACE TM-01-72 imidazolines obtained from commercial oils

| Imidazoline | Oil used | Physical Characteristic | NACE TM-01-72 |
|---|---|---|---|
| IFA | Sunflower | Oil | A |
| ICAN | Canola | Oil | A |
| ISC | Soybean | Oil | B |
| ICO | Safflower | Oil | A |
| IC123 | Canola/Sunflower | Oil | B |
| IMD | Corn | Oil | C |

*Primary gasoline to assess current and concentration of imidazoline 5 ppm

Example 2

Based imidazolines of Example 1, these were reacted in a stoichiometric ratio 1:1 with the organic acid of 2 to 6 carbons, preferably acrylic acid as shown in the following scheme (8).

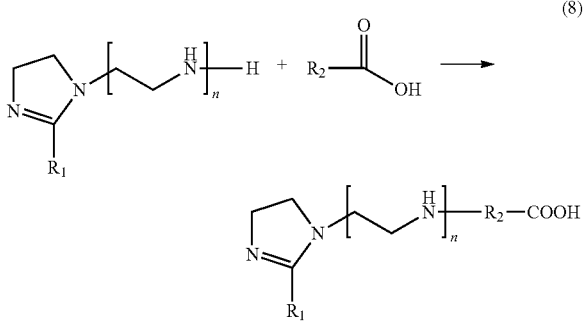

The reaction temperature was 120° C. for a 6 hours period with stirring. Concluded the time of reaction was cooled to room temperature, the product imidazoline-acrylic acid obtained amber color and very viscous, was evaluated under the test method NACE TM-0172 at a concentration of 5 ppm, using primary gasoline hydrocarbon and distilled water as corrosive medium (Table 4).

TABLE 4

Evaluation test Nace TM-0172 modified imidazolines with one mole carboxylic acid

| Imidazoline-acrylic oil | Oil used | Physical characteristics | NACE TM-0172 |
|---|---|---|---|
| IFA-1AA | Sunflower | Semisolid | B+ |
| ICAN-1AA | Canola | Semisolid | B |
| ISC-1AA | Soybean | Semisolid | B |
| ICO-1AA | Safflower | Semisolid | C |
| IC123-1AA | Canola/Sunflower | Semisolid | B |
| IMD-1AA | Corn | Semisolid | B+ |

*Primary gasoline to assess as current and concentration of imidazoline-acrylic acid 5 ppm
IFA-IAA imidazoline sunflower oil with one mole of acrylic acid
ICAN-1AA canola oil imidazoline with one mole of acrylic acid
ISC-1AA imidazoline soybean oil with one mole of acrylic acid
ICO-1AA safflower oil imidazoline with one mole of acrylic acid
Imidazoline 1C123-1AA canola oil/sunflower with one mole of acrylic acid
IMD-1AA corn oil imidazoline with one mole of acrylic acid For imidazolines sunflower oil, canola, safflower efficiency decreases, remaining constant soy and canola/Sunflower Example 1 (Table 3), corn oil only improves the efficiency of protection.

Example 3

The procedure is to increase the stoichiometric addition of another molecule of organic acid having 2 to 6 carbons, preferably acrylic acid, to the product obtained in Example 2, the reaction was carried at a temperature of 120° C. for a period 6 hours with stirring. Is the stoichiometric equation (9):

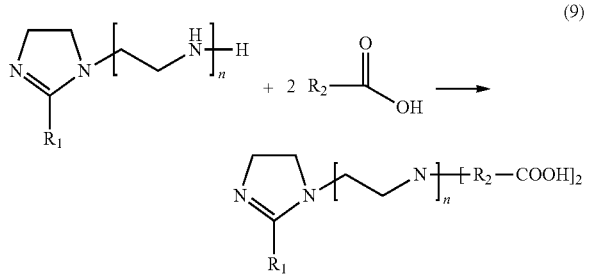

The products reaction obtained is still amber and viscous, which was characterized by infrared spectrum and comparing it with a similar spectrum of molecule but obtained with the fatty acid of tall oil, we have virtually the same molecule, of course with its peculiarities the product obtained is a mixture of fatty acids, also present glycerin as a reaction byproduct (FIG. 3. Infrared Spectroscopy imidazoline modified with two moles of carboxylic acid from tall oil fatty acids (red line), obtained from vegetable oils (blue line)).

Table 5 reports the evaluation of imidazoline method of Table 3 under NACE TM0172, reacted with 2 molecules of carboxylic acids, preferably acrylic acid.

The results confirm that the imidazoline added with two molecules of acrylic acid, significantly improves the efficiency of protection in all cases (see Table 4), when compared to a single molecule of acrylic acid in the test NACE TM0172 testing procedure.

TABLE 5

Evaluation of modified imidazolines with two moles of carboxylic acid in NACE TM0172 test

| Imidazolina-2 acrylic acid | Oil used | Physical Characteristics | NACE TM-01-72 |
|---|---|---|---|
| IFA-2AA | Sunflower | Solid | A |
| ICAN-2AA | Canola | Solid | A |
| ISC-2AA | Soybean | Solid | B+ |
| ICO-2AA | Safflower | Solid | A |
| IC123-2AA | Canola/Sunflower | Solid | A |
| IMD-2AA | Corn | Solid | B+ |

* Primary gasoline as a current to evaluate and concentration of imidazoline-2 acrylic acid 5 ppm

Example 4

Considering the products of example 3 were selected those with score "A". Of the same products, dilutions are made and the rust tests were determined again (Table 6).

TABLE 6

Evaluation Test NACE TM-01-72 imidazoline-2-carboxylic vegetable oil

| Imidazoline-2 acrylic acid | Oil used | % solvent | NACE TM-01-72 |
|---|---|---|---|
| IFA-2AA | Sunflower | 60 | A |
| ICAN-2AA | Canola | 60 | A |
| ICO-2AA | Safflower | 60 | B++ |
| IC123-2AA | Canola/Sunflower | 60 | B++ |

*Primary gasoline as a current to evaluate, concentration of active 5 ppm

The results indicate that IFA-2AA and ICAN-2AA maintain constant its inhibitory capacity and ICO-2AA and IC123-2AA there is little difference in relation to the rustproof with pure undiluted imidazolines, all pass the rustproof, we can mention is that those oils having a ratio of unsaturated/saturated lower than 7 do not pass rustproof. This phenomenon can be explained by the physical characteristics and relationship to their chemical structure of the fatty acids. For example, octadecanoic or stearic acid at room temperature is a solid wax-like, while the (tall oil) oleic acid is a liquid, and the only difference is the double bond in the oleic acid, this fact allows for more mobility to the imidazoline-2 carboxylics molecules in the portion of the unsaturated hydrocarbon chain, to disperse corrosives, providing thus, more protection.

Example 5

The compound IFA-2AA (40% active) was evaluated under the test bottle (NACE ID182) both medium sour ($H_2S$) and sweet ($CO_2$) using a mixture of V/V, with brine 90% (ASTM D1141) and 10% kerosene. For the sour brine, 500 to 600 mg/l of $H_2S$ were added, and sweet brine saturation was with $CO_2$, the test duration was 24 hours at a temperature of 60° C.

Table 7 shows the results of the bottle in sour means test, for the formulation of inhibitor (40%) in concentrations of 5 to 50 mg/L, it was observed that at concentrations of 5 ppm has close efficiencies 90% and it is increases as the concentration is increased to the IFA-2AA (40%).

TABLE 7

Results of IFA-2AA (40%)
Test medium bitter NACE ID182

| Sample | Concentration | Efficiency (% of protection) |
|---|---|---|
| IFA-2AA (40%) | 5 mg/l | 89.64 |
| | 10 mg/l | 93.43 |
| | 25 mg/l | 95.33 |
| | 50 mg/l | 92.06 |

For the sweet environment medium, the inhibitor has another sour behavior; usually inhibitors can be very efficient for sour but not for sweet environments, or vice versa. The case of IFA-2AA (40%) in sweet medium at a concentration of 5 mg/L have an efficiency of 88.21 but this does not increase significantly with increasing concentration of IFA-2AA (40%), but that about 90% efficiency (Table 8) is maintained.

TABLE 8

Results of the IFA-2AA (40%) of
NACE ID182 in sweet medium

| Sample | Concentration | Efficiency (% of protection) |
|---|---|---|
| IFA-2AA (40%) | 5 mg/l | 88.21 |
| | 10 mg/l | 90.09 |
| | 25 mg/l | 86.35 |
| | 50 mg/l | 90.73 |

The IFA-2AA (40%) inhibitor is a good choice when in a stream both media (sour and sweet) are presented, as in the case of pipelines carrying crude oil.

Example 6

Finally, as indicated by the NRF-005-PEMEX-2009 standard, the electrochemical test (Rp) was conducted under ASTM G 185 or equivalent method, which uses a rotating-cylinder electrode well defined for electrochemical measurements and for determination the corrosion rate. Brine used was prepared according to ASTM D 1141-98 for preparation of synthetic water.

Unlike test bottle (NACE ID182) where kerosene (10%) and brine (90%) are used, only brine is used in the electrochemical test (ASTM G 185). Sour medium was at concentrations of $H_2S$ from 500 to 600 ppm, pH of the brine of 3.0 and a test temperature of 60° C., using a control carbon steel 1018 and concentrations of 5, 10, 25 and 50 ppm inhibitor formulation. Under these conditions it was evaluated IFA-2AA (40% active) inhibitor obtain the results as shown in Table 9.

While we obtain efficiency values close protection 80 at very low concentrations in both turbulent and laminar regime, the efficiency value increases slightly with increased concentration of the inhibitor in the case of turbulent flow, however in the case of flow laminar significantly increases the efficiency of protection with increasing inhibitor concentration. As previously noted the difference between the test bottle and electrochemical (Rp) it is the use of hydrocarbon. In the electrochemical test having not kerosene inhibitors must be soluble in the brine to reach the witness, and this can be observed in turbulent flows efficiencies protection are higher than in laminar flow, because of the turbulence It helps better dispersing inhibitor in the brine, while in laminar flow the dispersion is to a lesser extent so that at concentrations of 50 ppm inhibitor get close to 90% efficiency values.

TABLE 9

Evaluation of IFA-2AA efficiency (40%)
by Electrochemical Techniques Rp

| Sample | Flow regime | Concentration (mg/l) | Efficiency (% of protection) | Efficiency (% of protection) EIS |
|---|---|---|---|---|
| IFA-2AA (40%) | Turbulent | 5 | 86.22 | 83.51 |
| | | 10 | 88.19 | 85.32 |
| | | 25 | 89.07 | 85.08 |
| | | 50 | 90.11 | 84.60 |
| | Laminate | 5 | 77.57 | 76.72 |
| | | 10 | 84.88 | 83.78 |
| | | 25 | 87.33 | 85.53 |
| | | 50 | 88.46 | 86.61 |

What is claimed is:

1. A method of inhibiting corrosion in a process of petroleum refining under the following operating conditions: Room temperature and lower than 200° C., pressure in the range 0-60 kg/cm$^2$, supply of 3-50 ppm in continuous form, comprising adding a corrosion inhibitor composition to hydrocarbon streams selected from the group consisting of crude oil, gasoline, middle distillates and oxygenated compounds, where the corrosion inhibitor is added to pumps, atmospheric domes towers and condensers, where said corrosion inhibitor composition comprises 30 wt % to 40 wt % of a carboxy-imidazoline derived from a vegetable oil selected from the group consisting of sunflower, canola, and canola/sunflower mixture, 5 wt % to 10 wt % glycerin, 50 wt % to 60 wt % of an aromatic solvent, and 10 wt % to 20 wt % of an alcohol.

2. The method in accordance with claim 1 wherein when evaluated under the rustproof method NACE TM0172 obtains values of A and B++, being the hydrocarbon primary gasoline and distilled water as etchant in concentrations of the inhibitor 5 and 10 ppm.

3. The method in accordance with claim 2 wherein when evaluated under the test bottle method NACE TM0172 obtains values of A and B++when diluted from 10 to 70% weight, preferably 60%, for aromatic solvent, alcohol or mixture of them being the hydrocarbon, primary gasoline, distilled water as corrosive agent and inhibitor at concentrations of 5 and 10 ppm.

4. The method according to claim 3, wherein, when evaluated by the test bottle (NACE ID182) in both, sour ($H_2S$) and sweet ($CO_2$) environments, it obtains an efficiency of up to 90% using a V/V mixture , with 90% brine (ASTM D1141) and 10% kerosene.

5. The method according to claim 1, wherein the hydrocarbon stream is a sour medium containing 500 to 600 mg/l of $H_2S$ and $CO_2$ saturation sweet medium at an inhibitor concentration of 5 to 50 ppm, at a temperature of 60° C. for a time of 10 to 40 hours.

6. The method according to claim 2, wherein when evaluated by electrochemical test (Rp) under the ASTM G 185 or equivalent method obtains an efficiency near 90% when using an electrode cylinder rotary and brine (ASTM D 1141) at inhibitor concentrations of 5 to 50 ppm for both turbulent flow and laminar.

7. The method according to claim 2, wherein when evaluated by the NRF-005-PEMEX-2009 standard which is based on the method NACE ID182, NACE TM0172 and ASTM G 185, ensures application in oil and pipelines up to 90% efficiency.

8. A method of inhibiting corrosion of metal surfaces of a refining apparatus in a process of refining a hydrocarbon stream at a temperature range of room temperature to 200° C., a pressure in the range 0-60 kg/cm$^2$, said method comprising adding 5 to 50 ppm of a corrosion inhibitor to the hydrocarbon stream, said hydrocarbon stream selected from the group consisting of crude oil, gasoline, middle distillates and oxygenated compounds, and said corrosion inhibitor comprises a carboxy-imidazoline corrosion inhibitor derived from vegetable oil selected from the group consisting of sunflower, canola, safflower, canola, and sunflower, 5 to 10 wt. % glycerin, 50 to 60 wt. % of an aromatic solvent, and 10-20 wt. % of an alcohol.

9. The method of claim 8, wherein said wherein said carboxy-imidazoline has the following structure:

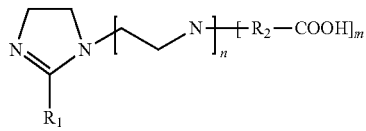

where:
R$_1$ is a radical from functional groups from saturated, monounsaturated or polyunsaturated vegetable oils having C$_8$ to C$_{22}$ carbon atoms; R$_2$ is an alkyl radical of a carboxylic acid with 2 to 6 carbon atoms, n is 1 to 3; and m is 1 to 3.

10. The method of claim 9, wherein the carboxylic acid is acrylic acid.

11. The method of claim 10, wherein said carboxy-imidazoline is obtained by reacting an imidazoline with a carboxylic acid, and where said imidazoline has the structure:

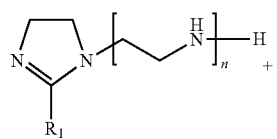

with two side chains, where R$_1$ are mixtures of lipids from a saturated or unsaturated vegetable oil, having from C$_8$ to C$_{22}$ carbon atoms; a second side chain is an alkyl amine 2 to 4 carbon atoms, and n is 1 to 3.

* * * * *